(12) United States Patent
Huang et al.

(10) Patent No.: US 11,196,046 B2
(45) Date of Patent: Dec. 7, 2021

(54) POSITIVE ACTIVE MATERIAL, PREPARATION PROCESS THEREOF, SODIUM ION BATTERY AND APPARATUS CONTAINING THE SAME

(71) Applicant: Contemporary Amperex Technology Co., Limited, Ningde (CN)

(72) Inventors: Liting Huang, Ningde (CN); Qian Liu, Ningde (CN); Chengdu Liang, Ningde (CN); Yongsheng Guo, Ningde (CN); Wenguang Lin, Ningde (CN); Jiadian Lan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/172,060

(22) Filed: Feb. 9, 2021

(65) Prior Publication Data

US 2021/0167375 A1 Jun. 3, 2021

Related U.S. Application Data

(63) Continuation of application No. PCT/CN2020/070136, filed on Jan. 2, 2020.

(30) Foreign Application Priority Data

Jan. 11, 2019 (CN) .......................... 201910026396.X

(51) Int. Cl.
*H01M 4/505* (2010.01)
*H01M 4/525* (2010.01)
(Continued)

(52) U.S. Cl.
CPC ........... *H01M 4/505* (2013.01); *H01M 4/525* (2013.01); *H01M 10/054* (2013.01); *H01M 2004/028* (2013.01); *H01M 2220/20* (2013.01)

(58) Field of Classification Search
CPC .... H01M 4/505; H01M 10/054; H01M 4/525; H01M 2220/20; H01M 2004/028
See application file for complete search history.

(56) References Cited

U.S. PATENT DOCUMENTS

2017/0317350 A1 11/2017 Ceder et al.

FOREIGN PATENT DOCUMENTS

| CN | 101043093 B | 6/2010 |
|---|---|---|
| CN | 104934597 A | 9/2015 |

(Continued)

OTHER PUBLICATIONS

PCT International Search Report for PCT/CN2020/070136, dated Apr. 15, 2020, 16 pages.

(Continued)

*Primary Examiner* — Cynthia K Walls
(74) *Attorney, Agent, or Firm* — Law Offices of Liaoteng Wang

(57) ABSTRACT

A positive electrode active material and a preparation process thereof, a sodium ion battery (5) and an apparatus containing the sodium ion battery (5) are described, the positive electrode active material satisfying the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and (I)

$$\frac{3.33+2(\delta-y-z)}{4} < x < \frac{3.33+2(\delta-y-z)}{3}.$$

21 Claims, 3 Drawing Sheets

(51) Int. Cl.
H01M 10/054 (2010.01)
H01M 4/02 (2006.01)

(56) References Cited

FOREIGN PATENT DOCUMENTS

| CN | 105185958 A | 12/2015 |
|---|---|---|
| CN | 105226268 A | 1/2016 |
| CN | 105244496 A | 1/2016 |
| CN | 107706375 A | 2/2018 |
| CN | 108163897 A | 6/2018 |
| CN | 108899538 A | 11/2018 |
| CN | 108963317 A | 12/2018 |
| CN | 108987708 A | 12/2018 |
| JP | 2015176678 A | 10/2015 |
| WO | WO2015177544 A1 | 11/2015 |

OTHER PUBLICATIONS

The First Office Action and search report dated Dec. 29, 2020 for Chinese Application No. 201910026396.X, 11 pages.
Peng-Fei Wang et al., "Suppressing the P2—O2 Phase Transition of Na0.67Mn0.67Ni0.33O2 by Magnesium Substitution for Improved Sodium-Ion Batteries", Angewandte Chemie, vol. 126, pp. 8752-8761.
Lei Wang et al., "Copper-substituted Na0.67Ni0.3xCuxMn0.7O2 cathode materials for sodium-ion batteries with suppressed P2—O2 phase transition", Journal of Materials Chemistry A, vol. 5, pp. 7571-7575.
Gurpreet Singh et al., "High Voltage Mg-Doped Na0.67Ni0.3-xMgxMn0.7O2 (x = 0.05, 0.1) Na-Ion Cathodes with Enhanced Stability and Rate Capability", Chemistry of Materials, vol. 28, No. 14, pp. 5087-5094.
Huidan Hou et al., "P2-Type Na0.67Ni0.23Mg0.1Mn0.67O2 as a High-Performance Cathode for a Sodium-Ion Battery", Inorganic Chemistry, vol. 55, No. 17, pp. 9033-9037.
Wenpei Kang et al., "P2-Type NaxCu0.15Ni0.20Mn0.65O2 Cathodes with High Voltage for High-Power and Long-Life Sodium-Ion Batteries", ACS Applied Materials & Interfaces, vol. 8, No. 46, pp. 31661-31668.
Mingying Li et al., "Research progress in ternary cathode materials for sodium-ion battery", Battery Bimonthly, vol. 46, No. 5, pp. 285-288.
The second Official Action and supplemental search report dated Mar. 11, 2021 for Chinese Application No. 201910026396.X, 22 pages.
Minghua Wang, "Introduction to New Energy", Metallurgical Industry Press, dated May 31, 2014, 1 Page.
Shuai Zhang, "New Energy", Wen Hui Press, dated May 31, 2011, 3 Pages.
The Extended European Search Report dated Oct. 18, 2021 for European Application No. 20738915.6, 7 pages.
Singh Gurpreet et al.: "High Voltage Mg-Doped Na 0.67 Ni 0.3- x Mg x Mn 0.7 0 2 (x = 0.05, 0.1) Na-Ion Cathodes with Enhanced Stability and Rate Capability", dated Jul. 11, 2016, 8 Pages.
Yanrong Wang et al : "Emerging non-lithium ion batteries", dated Apr. 13, 2016, 27 Pages.

POSITIVE ACTIVE MATERIAL, PREPARATION PROCESS THEREOF, SODIUM ION BATTERY AND APPARATUS CONTAINING THE SAME

CROSS-REFERENCE TO RELATED APPLICATION

This application a continuation of International Application No. PCT/CN2020/070136, filed on Jan. 2, 2020, which claims priority to Chinese Patent Application No. 201910026396.X filed on Jan. 11, 2019, both of which are incorporated herein by reference in their entireties.

TECHNICAL FIELD

This application belongs to the technical field of energy storage apparatus, and specifically relates to a positive active material, preparation process thereof, a sodium-ion battery and an apparatus containing the same.

BACKGROUND

At present, lithium-ion batteries occupy the core position of power batteries. However, the lithium-ion batteries are also facing great challenges, such as inferior issues from increasing shortage of lithium resources, rising price of upstream materials, lagging development of recycling technology, and recycling rate of consumed batteries and the like. Sodium ion battery can realize charge and discharge by using the intercalation-deintercalation process of sodium ion between positive and negative electrodes. Moreover, the reserves of sodium resources are far more abundant and more widely distributed than lithium. In view of the far low cost of sodium resources than that of lithium, sodium ion battery has become a new generation of electrochemical system with great potential to replace lithium-ion batteries.

Similar to lithium ion batteries, a positive electrode active material is a key factor affecting the performance of sodium ion batteries. Therefore, how to improve the performance of the positive electrode active material has become an important topic in the development of sodium ion batteries.

SUMMARY

The inventors found that among various positive electrode active materials that have been extensively studied, such as oxides, fluorides, sulfides, phosphates, pyrophosphates, metal organic frameworks/metal hexacyanides, and organic compounds, those transition metal oxide positive active materials with a layered structure have a higher theoretical capacity, a higher density and an ease of material preparation, so they have become a very potential positive active material for sodium ion batteries. From the perspective of commercialization, transition metal oxides with a layered structure preferentially contain active transition metals with abundant reserves and low prices, such as manganese. However, such low-cost monobasic transition metal oxides as a positive electrode active material have the disadvantages of lower capacity performance and average voltage and have a short cycle life, making it difficult to meet commercial performance requirements.

The inventors has conducted a lot of research intended to improve performances of the positive electrode active material, so that it can have higher capacity performance and average voltage, while having higher cycle performance, thereby providing a sodium ion battery which can have high capacity performance, average voltage and cycle performance at the same time.

Therefore, in a first aspect, the present application provides a positive electrode active material satisfying the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and $$\frac{3.33+2(\delta-y-z)}{4} < x < \frac{3.33+2(\delta-y-z)}{3}.$$

In a second aspect, the present application provides a process for preparing a positive electrode active material, comprising the following steps: mixing a sodium precursor, manganese oxide, an oxide of A and an oxide of B to form a mixture, and then sintering the mixture to obtain the positive electrode active material;

wherein positive electrode active material satisfies the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and $$\frac{3.33+2(\delta-y-z)}{4} < x < \frac{3.33+2(\delta-y-z)}{3}.$$

In a third aspect, the present application provides a sodium ion battery, comprising a positive electrode plate, the positive electrode plate comprising the positive electrode active material of the first aspect of the present application.

In a fourth aspect, the present application provides an apparatus, comprising the sodium ion battery of the third aspect of the present application.

Compared with the prior art, the present application has at least the following beneficial effects:

The positive electrode active material provided by the present application meets the chemical formula $Na_{0.67}Mn_xA_yB_zO_{2\pm\delta}$, in which an electrochemically active transition metal A and a non-electrochemically active metal B are doped, and the ratio of each element in the positive electrode active material is controlled within a specific range, which enables the positive electrode active material to have higher capacity performance, average voltage and cycle performance. Therefore, the sodium ion battery adopting the positive electrode active material can also have higher capacity performance, average voltage and cycle performance.

The apparatus of the present application comprise the sodium ion battery as provided by the present application, thus having at least the same technical effects as the sodium ion battery.

DESCRIPTION OF THE DRAWINGS

In order to explain the technical solutions of the embodiments of the present invention more clearly, the following will briefly introduce the drawings for the embodiments of the present invention. Obviously, the drawings described below are only some embodiments of the present invention. For those of ordinary skill in the art, other drawings can be obtained based on the drawings without any creative labor.

DETAILED DESCRIPTION

Figure 1:
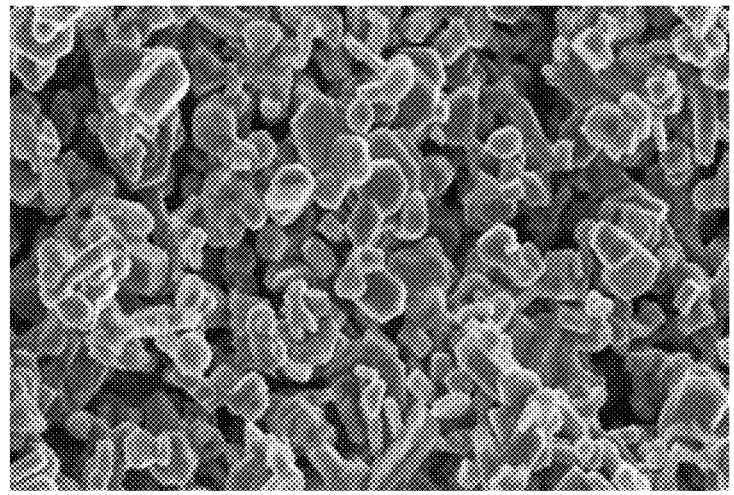
FIG. 1 is a scanning electron microscopy (SEM) image of the positive electrode active material provided in Example 1 of the application.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Active Material

First of all, the positive active material according to the first aspect of the present application is described. The positive electrode active material satisfies the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and $$\frac{3.33 + 2(\delta - y - z)}{4} < x < \frac{3.33 + 2(\delta - y - z)}{3}.$$

The positive electrode active material according to the present application doped with an electrochemically active transition metal A can improve the stability of the positive electrode active material at air environment and effectively reduce the capacity loss of the positive electrode active material during the first charge. And during the charge and discharge process, the electron transfer of the transition metal A provides effective charge compensation for the deintercalation/intercalation of sodium ions, thereby effectively increasing the average voltage and specific capacity of the positive electrode active material. Preferably, A comprises or is Ni.

The positive electrode active material according to the present application also doped with a non-electrochemically active metal B can effectively improve the structural stability and capacity retention rate of the positive electrode active material during charge and discharge cycles, thereby greatly improving the cycle performance of the positive electrode active material. Preferably, B is selected from one or more of Mg, Ca, Ti, Cu, Zn and Ba. More preferably, B is selected from one or more of Mg, Ti, Cu, Zn and Ba.

The positive electrode active material according to the present application satisfies the chemical formula of $Na_{0.67}Mn_xA_yB_zO_{2\pm\delta}$, in which the ratio of each element that is controlled within the specific range enables the positive electrode active material to have fewer chemical composition defects and reduce impurity phase contained in the material, and especially enable the synergistic effect of the transition metal A and metal B to be fully achieved, thereby effectively improving the cycle performance and capacity performance of the positive electrode active material.

Moreover, the presence of $$\frac{3.33 + 2(\delta - y - z)}{4} < x < \frac{3.33 + 2(\delta - y - z)}{3}$$

can also effectively suppress the lattice distortion of the positive electrode active material caused by the John-Teller effect while ensuring the electrochemical activity of Mn, which makes the structure of the positive electrode active material more stable, and reduces the damage to the positive electrode and the negative electrode caused by the dissolution of manganese ions as well as also ensure that the sodium ion battery has a low internal resistance, thereby further improving the cycle performance and capacity performance of the positive electrode active material.

Therefore, the positive active material of the present application can have higher capacity performance, average voltage, and cycle performance.

The positive electrode active material according to the present application satisfies $0.6<x<1$. Optionally, $x\geq0.61$, $\geq0.62$, $\geq0.63$, $\geq0.64$, $\geq0.65$, or $\geq0.67$. Further, x may be $\leq0.98$, $\leq0.96$, $\leq0.94$, $\leq0.92$, $\leq0.90$, $\leq0.88$, $\leq0.85$, $\leq0.83$, $\leq0.80$, $\leq0.78$, $\leq0.75$, $\leq0.73$, $\leq0.72$, or $\leq0.70$. Preferably, $0.65\leq x\leq0.9$. Keeping the ratio of Mn within the appropriate range is beneficial to further improve the capacity performance, average voltage and cycle performance of the positive electrode active material.

The positive electrode active material according to the present application satisfies $0<y<0.1$. Optionally, $y\geq0.005$, $\geq0.01$, $\geq0.02$, $\geq0.03$, $\geq0.035$, $\geq0.04$, $\geq0.045$, or $\geq0.05$. Further, y may be $\leq0.095$, $\leq0.09$, $\leq0.08$, $\leq0.07$, $\leq0.065$, $\leq0.06$, $\leq0.055$, $\leq0.05$, $\leq0.045$, or $\leq0.04$. Preferably, $0.03\leq y\leq0.07$. Keeping the ratio of the transition metal A within the appropriate range is beneficial to further improve the capacity performance and cycle performance of the positive electrode active material while making the positive electrode active material to have a higher average voltage.

In some embodiments, the positive active material according to the present application satisfies $1 \leq z/y \leq 12$. By controlling the ratio of transition metal A and metal B in the positive electrode active material within the appropriate range, the synergistic effect of transition metal A and metal B can function better, the unit cell parameter c/a increases, and the metal-oxygen (MO) bond is strengthened, so that the crystal structure of the positive electrode active material has a larger layer spacing, and it is more easier for the sodium ions to deintercalate/intercalate between the layers, thereby increasing the charge and/or discharge specific capacity of the positive electrode active material. In addition, having the appropriate z/y also enables the positive electrode active material to have a more stable structure and a higher cycle capacity retention rate.

In some embodiments of the present application, z/y may be $\geq 1$, $\geq 2$, $\geq 2.3$, $\geq 2.7$, $\geq 3$, $\geq 3.2$, $\geq 3.5$, $\geq 4$, $\geq 4.5$, $\geq 5$, $\geq 5.5$, $\geq 6$, or $\geq 6.5$. Further, z/y may be $\leq 12$, $\leq 11.5$, $\leq 11$, $\leq 10.5$, $\leq 10$, $\leq 9.5$, $\leq 9$, $\leq 8.5$, $\leq 8$, $\leq 7.5$, $\leq 7$, $\leq 6.5$, or $\leq 6$.

Preferably, the positive electrode active material according to the present application satisfies $3 \leq z/y \leq 9$, which can further increase the charge and/or discharge specific capacity and cycle capacity retention rate of the positive electrode active material.

In some embodiments, the positive active material according to the present application has a unit cell parameter c/a of preferably $3.8510 \leq c/a \leq 4.9000$. The unit cell parameter c/a of the positive electrode active material within in the appropriate range enables the MO bond to be strengthened and the structure of the positive electrode active material to be more stable, which is embodied that the positive electrode active material has a better cycle performance. Moreover, the above mentioned unit cell parameter c/s range also makes the layer spacing of the positive electrode active material increased, is conducive to deintercalation/intercalation of sodium ions between layers, and is beneficial to increase the charge and/or discharge specific capacity of the positive electrode active material. In above mentioned appropriate range, the larger the unit cell parameter c/a, the stronger the M-O bond is, and the more stable the structure of the positive electrode active material is. Thus, the cycle performance is better.

More preferably, the unit cell parameter c/a of the positive electrode active material is $3.8602 \leq c/a \leq 3.8800$. The positive electrode active material has higher cycle performance and capacity performance.

In some embodiments, the positive active material has a hexagonal phase crystal structure. The positive electrode active material with a hexagonal symmetry crystal structure has more obvious layered properties, thus can have higher specific capacity and energy density. In addition, the positive electrode active material has better structural stability, which has less structural change caused by the sodium ion deintercalation/intercalation process, and constitutes a good main frame for the reversible deintercalation/intercalation of sodium ions, so it is beneficial to improve the capacity and cycle performance of the positive electrode active material.

In some embodiments, the positive electrode active material according to the present application has an average particle size Dv50 of preferably 3 μm to 20 μm, more preferably from 5 μm to 12 μm. The positive electrode active material having a Dv50 of preferably less than 20 μm makes ensure that the transmission path of sodium ions and electrons in the positive electrode active material is short, and the ion conductivity and conductivity of the positive electrode active material are improved, thereby improving the electrochemical kinetic performance and rate performance during charge and discharge. In addition, less positive plate polarization phenomenon occurs in the battery using the positive electrode active material, so that the capacity retention rate during the charge and discharge cycle can be improved. The positive electrode active material having a Dv50 of preferably 3 μm or more enables the positive electrode active material to have a higher gram capacity while reducing side reactions of electrolyte on the surface of the material, thereby improving the energy density and cycle performance of the battery.

The positive electrode active material having an average particle diameter Dv50 of preferably 3 μm to 20 μm can also enable the positive electrode active material to have an appropriate specific surface area. In some embodiments, the specific surface area of the positive active material is preferably from 0.01 $m^2$/g to 6 $m^2$/g, more preferably from 0.5 $m^2$/g to 4 $m^2$/g. The positive electrode active material having a specific surface area within the appropriate range enables the positive electrode active material to have a larger active specific surface area while reducing side reactions on the surface of the particles and gas production, thereby ensuring that the material has higher electrochemical performance. In addition, the positive electrode active material having the appropriate specific surface area can effectively reduce agglomeration between particles of the positive electrode active material and improve the cycle performance.

The positive electrode active material having a specific surface area within the appropriate range can also reduce liquid absorption during the preparation of the positive electrode slurry, increase the solid content and particle dispersion uniformity in the positive electrode slurry, thereby improving the particle dispersion uniformity and compacted density of the positive electrode active material layer, further increasing the energy density of the sodium ion battery, and improving the rate performance and cycle performance of the sodium ion battery.

In some embodiments, the positive electrode active material according to the present application has a powder resistivity of preferably 20 Ω·cm to 10000 Ω·cm, more preferably 20 Ω·cm to 1000 Ω·cm under a pressure of 12 MPa. The positive electrode active material having a powder resistivity within the appropriate range can further improve the rate performance of the sodium ion battery while making sure that the sodium ion battery has higher safety performance.

In some embodiments, preferably, the positive electrode active material has a tap density of $\geq 1.5$ g/$cm^3$. More preferably, the tap density of the positive electrode active material is from 1.5 g/$cm^3$ to 3.0 g/$cm^3$. The positive electrode active material having the appropriate tap density is beneficial to make the positive electrode active material have an appropriate compacted density.

In some embodiments, preferably, the positive electrode active material has a compacted density of $\geq 3$ g/$cm^3$ under a pressure of 8 tons. More preferably, the compacted density of the positive electrode active material is from 3.5 g/$cm^3$ to 5 g/$cm^3$. The positive electrode active material having the appropriate compacted density enables the positive electrode active material to have a higher specific capacity, and enables the sodium ion battery containing the positive electrode active material to have a higher cycle performance. Within the appropriate range, the higher the compacted density of the positive electrode active material, the higher its specific capacity is.

By making the average particle size Dv50 of the positive electrode active material within the appropriate range, it is advantageous for the positive electrode active material to have an appropriate tap density and/or compacted density.

In some embodiments, the positive electrode active material has a morphology that is preferably a polygonal sheet structure. For example, it is one or more of a triangular sheet structure, a square sheet structure and a hexagonal sheet structure, preferably a hexagonal sheet structure. Using the positive electrode active material with such a morphology can make the positive electrode active material particles in the positive electrode active material layer have a suitable gap between the particles and enable the positive electrode active material layer to have a better porosity, thereby making the positive electrode active material layer to have high electrolyte wettability, which is beneficial to improve the cycle performance and energy density of the sodium ion battery. Using the positive electrode active material with such a morphology can also reduce the agglomeration among the positive electrode active material particles in the positive electrode active material layer, thereby making the sodium ion battery to have higher cycle performance.

The unit cell parameter c/a of the positive electrode active material has the meaning known in the art, and refers to the ratio of the c axis to the a axis of the positive electrode active material crystal. The crystalline structure of the positive electrode active material can be determined by an X-ray powder diffractometer, for example, a Brucker D8A_A25 X-ray diffractometer from Brucker AxS, Germany, with CuKα rays as the radiation source having a ray wavelength $\lambda=1.5418$ Å, in which the scanning 2θ angle range is 10°~90° and the scan rate is 4°/min.

The specific surface area of the positive active material has the meaning known in the art, and can be measured with instruments and methods known in the art. For example, the specific surface area may be measured with nitrogen adsorption specific surface area analysis, and calculated by the BET (Brunauer Emmett Teller) method, in which the nitrogen adsorption specific surface area analysis can be carried out by a specific surface and pore size distribution analyzer of Type: Tri Star II 3020 from Micromeritics, USA.

The average particle size Dv50, of the positive active material have the meanings well known in the art, and can be measured with instruments and methods known in the art, for example, with a laser particle size analyzer, such as Mastersizer 3000 laser particle size analyzer from Malvern Instruments Co., Ltd., UK.

The morphology of the positive electrode active material can be measured by instruments and methods known in the art, for example, with a field emission scanning electron microscope, such as SIGMA 500 high-resolution field emission scanning electron microscope from Carl Zeiss, Germany.

The tap density of the positive electrode active material can be measured by instruments and methods known in the art. For example, it can be conveniently measured with a tap density tester, such as FZS4-4B tap density tester.

The compacted density of the positive electrode active material can be measured by instruments and methods known in the art. For example, it can be conveniently measured with an electronic pressure tester, such as a UTM7305 electronic pressure tester.

Next, the preparation process of the positive electrode active material provided by the second aspect of the present application will be described. By the preparation process, the positive electrode active material described in the present application can be obtained. The process for preparing the positive electrode active material provided by the present application comprises the following steps: mixing a sodium precursor, manganese oxide, the oxide of A and the oxide of B uniformly with grinding in a stoichiometric ratio to form a mixture, and then sintering the mixture to obtain the positive electrode active material.

The sodium precursor may include one or more of sodium carbonate, sodium bicarbonate, and sodium hydroxide. In some embodiments, the sodium precursor comprises or is sodium carbonate.

The calcination can be carried out using methods and equipment known in the art, for example, using a muffle furnace. The calcination temperature may be from 800° C. to 1000° C., for example, from 850° C. to 950° C., and for example, about 900° C. The calcination time may be from 4 h to 30 h, for example, from 8 h to 20 h, and for example about 12 h.

The preparation of the positive electrode active material of the present application is not limited to the above-mentioned solid phase method, and a liquid phase method may also be used. Those skilled in the art can prepare the above-mentioned positive electrode active material according to the chemical composition and structure of the above-mentioned positive electrode active material following preparation steps of the liquid phase method.

Positive Electrode Plate

The present application also provides a positive electrode plate, which comprises a positive electrode current collector and a positive electrode active material layer provided on the positive electrode current collector. For example, the positive electrode current collector has two opposite surfaces, and the positive electrode active material layer is laminated on either or both of the two surfaces of the positive electrode current collector.

The positive electrode current collector can be made of a metal foil, a carbon-coated metal foil or a porous metal plate, preferably aluminum foil.

The positive active material layer comprises the positive active material of the first aspect of the present application.

In some embodiments, the positive active material layer may further comprise a binder. As an example, the binder may comprise one or more of styrene butadiene rubber (SBR), water-based acrylic resin, sodium carboxymethyl cellulose (CMC-Na), polyvinylidene fluoride (PVDF), polytetrafluoroethylene ethylene (PTFE), ethylene-vinyl acetate copolymer (EVA) and polyvinyl alcohol (PVA).

In some embodiments, the positive active material layer may further comprise a conductive agent. As an example, the conductive agent may comprise one or more of superconducting carbon, acetylene black, carbon black, Ketjen black, carbon dots, carbon nanotubes, graphene, and carbon nanofibers.

The positive electrode plate can be prepared according to conventional methods in the art. Typically, the positive electrode active material and optional conductive agent and binder are dispersed in a solvent (such as N-methylpyrrolidone, referred to as NMP) to form a uniform positive electrode slurry, and the positive electrode slurry is coated on the positive electrode current collector followed by drying and rolling, thereby forming a positive electrode plate.

Since the positive electrode plate of the present application adopts the positive electrode active material according to the first aspect of the present application, it can have higher capacity performance, average voltage and cycle performance.

Sodium Ion Battery

The third aspect of the present application provides a sodium ion battery comprising the above-mentioned positive electrode plate, the positive electrode plate comprising any one or more of the positive active material according to the present application.

The sodium ion battery further comprises a negative electrode plate, a separator, and an electrolytic solution.

In some embodiments, the negative electrode plate may be a metal sodium sheet.

In some embodiments, the negative electrode plate may also comprise a negative electrode current collector and a negative electrode active material layer disposed on the negative electrode current collector. For example, the negative electrode current collector has two opposite surfaces, and the negative electrode active material layer is laminated on either or both of the two surfaces of the negative electrode current collector.

In some embodiments, the negative electrode current collector can be made of a metal foil, a carbon-coated metal foil or a porous metal plate, and preferably copper foil.

The negative active material layer comprises a negative active material, which may be a negative active material known in the art. As an example, the negative electrode active material may include, but is not limited to, one or more of natural graphite, artificial graphite, mesophase carbon microspheres (MCMB), hard carbon, and soft carbon.

In some embodiments, the negative active material layer may further comprise a conductive agent, which may be a conductive agent known in the art for battery negative electrodes. As an example, the conductive agent may include, but is not limited to, one or more of superconducting carbon, acetylene black, carbon black, Ketjen black, carbon dots, carbon nanotubes, graphene, and carbon nanofibers.

In some embodiments, the negative active material layer may further comprise a binder, which may be a binder known in the art for battery negative electrodes. As an example, the binder may include, but is not limited to, one or more of styrene-butadiene rubber (SBR), water dispersible acrylic resin, and sodium carboxymethyl cellulose (CMC-Na).

In some embodiments, the negative active material layer may further comprise a thickener, which may be a thickener known in the art for battery negative electrodes. As an example, the thickener may include, but is not limited to, sodium carboxymethyl cellulose (CMC-Na).

The negative electrode plate can be prepared according to conventional methods in the art. Typically, the negative electrode active material and optional conductive agent, binder and thickener are dispersed in a solvent, in which the solvent can be deionized water, to form a uniform negative electrode slurry. The negative electrode slurry is coated on the negative electrode current collector followed by drying, cold pressing and other processes, thereby obtaining a negative electrode plate.

There is no particular limitation on the separator, and any well-known separator having a porous structure with chemical and mechanical stability can be used. For example, the separator can be selected from glass fiber, non-woven fabric, polyethylene, polypropylene, polyvinylidene fluoride and multilayer composite film thereof.

In some embodiments, the electrolytic solution may comprise an organic solvent and an electrolyte sodium salt. As an example, the organic solvent may comprise one or more of ethylene carbonate (EC), propylene carbonate (PC), ethyl methyl carbonate (EMC), and diethyl carbonate (DEC). The electrolyte sodium salt may include one or more of $NaPF_6$, $NaClO_4$, $NaBCl_4$, $NaSO_3CF_3$, and $Na(CH_3)C_6H_4SO_3$.

The above-mentioned positive electrode plate, separator, and negative electrode sheet are stacked in order, so that the separator is located between the positive electrode plate and the negative electrode plate for isolation, thereby forming a battery core. The battery core can also be obtained after winding. The resulting battery core is placed in a packaging shell, in which the electrolytic solution is injected and then the package shell is sealed, thereby obtaining a sodium ion battery.

Since the sodium ion battery of the present application adopts the positive electrode active material according to the first aspect of the present application, it can have a higher comprehensive electrochemical performance, i.e. exhibiting a higher capacity performance, average voltage and cycle performance.

Figure 2:
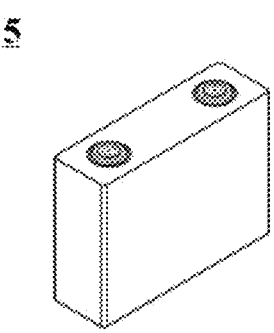
FIG. 2 is a perspective view of a sodium ion battery according to an embodiment of the present application.

The present application has no particular limitation on the shape of the sodium ion battery, which may be cylindrical, square or any other shapes. FIG. 2 shows a sodium ion battery 5 with a square structure as an example.

In some embodiments, the sodium ion battery may comprise an outer package. The outer packaging is used to package the positive electrode plate, the negative electrode plate and the electrolytic solution.

In some embodiments, the outer packaging of the sodium ion battery may be a soft bag, such as a pouch type soft bag. The material of the soft bag can be plastic, for example, it can comprise one or more of polypropylene (PP), polybutylene terephthalate (PBT), polybutylene succinate (PBS). The outer packaging of the sodium ion battery may be a hard case, such as a hard plastic case, an aluminum case, a steel case.

Figure 3:
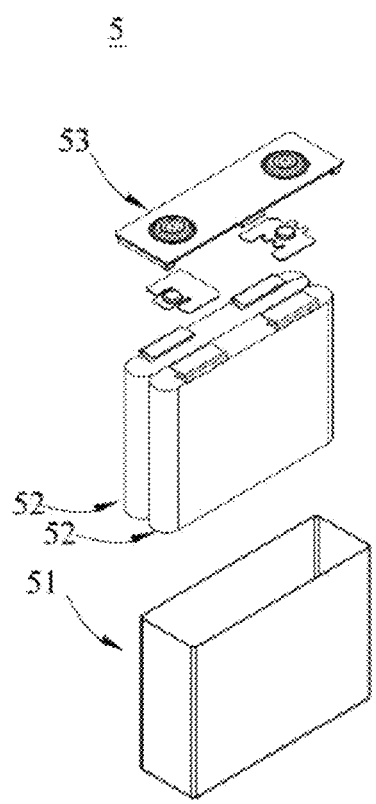
FIG. 3 is an exploded view of FIG. 2.

In some embodiments, referring to FIG. 3, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolytic solution is infiltrated in the electrode assembly 52.

The number of electrode assemblies 52 contained in the sodium ion battery 5 can be one or more, which can be adjusted according to requirements.

In some embodiments, the sodium ion battery can be assembled to form a battery module. The number of sodium ion batteries contained in the battery module can be multiple, and the specific number can be adjusted according to the application and capacity of the battery module.

Figure 4:
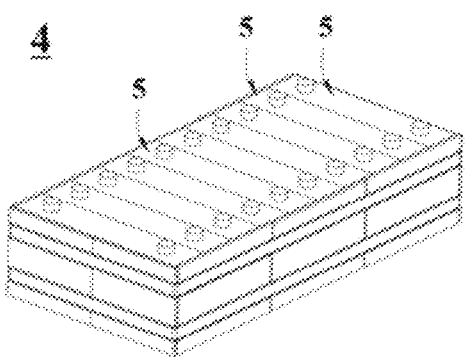
FIG. 4 is a perspective view of a battery module according to an embodiment of the present application.
Figure 5:
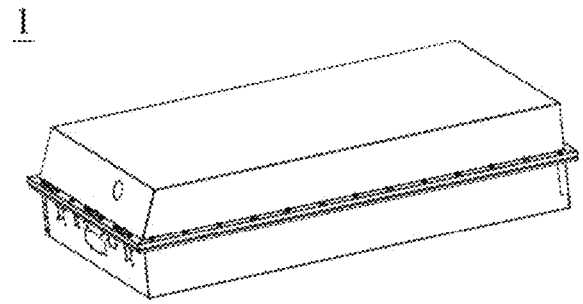
FIG. 5 is a perspective view of a battery pack according to an embodiment of the present application.

FIG. 4 is a battery module 4 as an example. Referring to FIG. 5, in the battery module 4, a plurality of sodium ion batteries 5 may be arranged in sequence along the length direction of the battery module 4. Of course, it can also be arranged in any other manner. Further, the plurality of sodium ion batteries 5 can be fixed by fasteners.

Optionally, the battery module 4 may further comprise a housing with a receiving space, and a plurality of sodium ion batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 6:
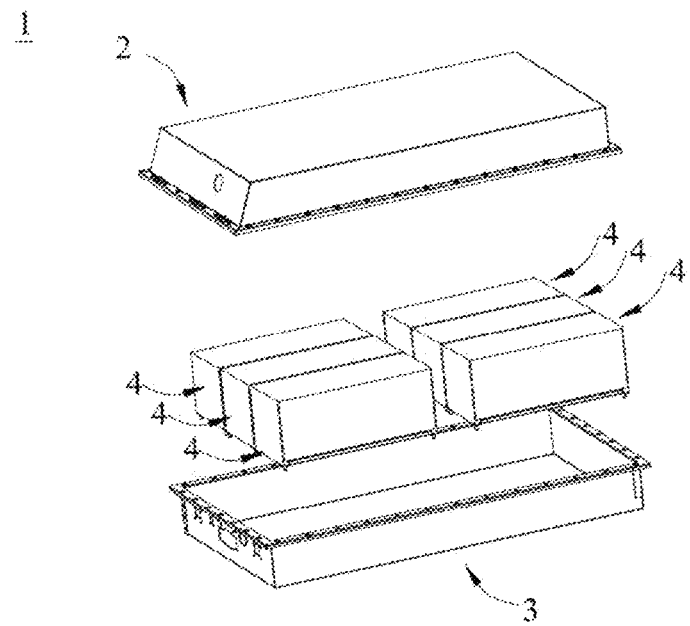
FIG. 6 is an exploded view of FIG. 5.

FIGS. 5 and 6 are the battery pack 1 as an example. Referring to FIGS. 5 and 6, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

Apparatus

The fourth aspect of the present application provides an apparatus comprising the sodium ion battery of the third aspect of the present application. The sodium ion battery can be used as a power source of the apparatus, and can also be used as an energy storage unit of the apparatus. The apparatus can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, and the like.

A sodium ion battery, a battery module, or a battery pack may be applied to the apparatus according to its usage requirements.

Figure 7:
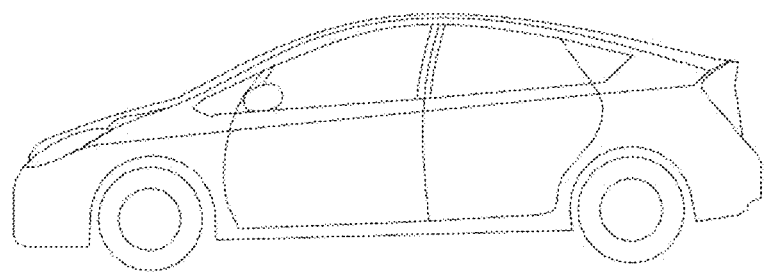
FIG. 7 is a schematic view showing an apparatus with a sodium ion battery as a power source according to an embodiment of the present application.

FIG. 7 is an apparatus as an example. The apparatus is a pure electric vehicle, a hybrid electric vehicle, or a plug-in hybrid electric vehicle. In order to meet the requirements of the apparatus for high power and high energy density of batteries, a battery pack or a battery module can be used.

As another example, the apparatus may be a mobile phone, a tablet computer, a notebook computer, etc. The apparatus is generally required to be thin and light, and a sodium ion battery can be used as a power source.

EXAMPLES

The following examples are intended to describe the disclosure of the present application in more detail for only illustrative purpose, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Positive Active Materials

Sodium carbonate ($Na_2CO_3$), manganese oxide (MnO), oxide of A (NiO) and oxide of B (MgO) were mixed homogeneously in a stoichiometric ratio with grinding, and then the resulting mixture was placed in muffle furnace and sintered at 900° C. for 12 h to obtain a positive active material.

Preparation of Button Battery

1) Preparation of positive electrode plate

The prepared positive active material, conductive carbon black super P and binder polyvinylidene fluoride (PVDF) were mixed in a weight ratio 80:15:5 in an appropriate amount of N-methyl pyrrolidone (NMP) to form a uniform positive electrode slurry; and then the resulting positive electrode slurry was coated on aluminum foil as a positive electrode current collector followed by drying and rolling, thereby obtaining the positive electrode plate.

2) Sodium metal was used as the negative electrode is made of.

3) Glass fiber film was used as separator.

4) Preparation of electrolyte

Ethylene carbonate (EC) and propylene carbonate (PC) were mixed uniformly in 1:1 volume to obtain an organic solvent, and then sodium perchlorate $NaClO_4$ was uniformly dissolved in the organic solvent to obtain the electrolyte, in which the concentration of sodium perchlorate was 1 mol/L.

5) The positive electrode plate, separator and negative electrode plate were stacked in order, and the electrolyte was added therein and sealed to obtain the button type battery.

Examples 2-20 and Comparative Examples 1-3

Above Examples and comparative example were similar to example 1 with the exception that the reaction parameters for the preparation process of the positive active material were adjusted. The specific parameters are shown in Table 1 below.

Test Methods (1) Test for c/a Unit Cell Parameter of Positive Active Materials

At 25° C., the positive active material in the examples and comparative examples were radiated with Cuk α rays as the radiation source having a ray wavelength of λ=1.5418 Å at high vacuum under the conditions of working distance of 6 mm and tube voltage of 10.0 kV for XRD spectrum in which the scanning angle range for 2θ was from 10° to 90° and the scanning rate was 4°/min. The X-ray diffraction met the Bragg equation: $2d \sin \theta = n \lambda$, where λ is the wavelength of X-ray; θ is the diffraction angle; D is the plane spacing of crystal; and n is an integer. The wavelength λ could be measured by the known X-ray diffraction angle, and then the plane spacing could be obtained, i.e. the regular arrangement of atoms or ions in the crystal. The unit cell parameters a and c can be further determined by the refinement of XRD spectrum, thereby obtaining c/a value of the positive active material.

2. Tests for Capacity Performance and Cycle Performance of Positive Active Materials Under normal pressure (0.1 MPa) at 25° C., the sodium ion button batteries obtained by Examples and Comparative Examples were charged at a constant current rate of 0.1 C to voltage of 4.5V. The resulting charge capacity was recorded as charge specific capacity for $1^{st}$ cycle of button battery. After standing for 5 minutes, the battery was discharged to 2.0V at a constant current rate of 0.1 C, which was a charge-discharge cycle. The resulting discharge capacity was recorded as discharge specific capacity for $1^{st}$ cycle. The button battery was subjected to 30 charge and discharge cycles following the procedure described above, and the charge specific capacity and the discharge specific capacity for each cycle were recorded.

Cycle capacity retention rate (%) of sodium ion button battery after 30 cycles=discharge specific capacity for the $30^{th}$ cycle/discharge specific capacity for the $1^{st}$ cycle×100%

Coulomb efficiency (%) of sodium ion button battery for the $n^{th}$ cycle=discharge specific capacity for the $n^{th}$ cycle/charge specific capacity for the $n^{th}$ cycle×100%

Test results of Examples 1-20 and Comparative Examples 1-3 were listed in table 1.

TABLE 1

| | Positive Active Material | Unit Cell c/a | Average particle size $D_v50$ (μm) | Charge specific capacity for $1^{st}$ cycle (mAh/g) | Discharge specific capacity for $1^{st}$ cycle (mAh/g) | Average Voltage (V) | Capacity Retention rate after 30 cycles (%) |
|---|---|---|---|---|---|---|---|
| Ex 1 | $Na_{0.67}Mn_{0.7}Ni_{0.05}Mg_{0.25}O_2$ | 3.8661 | 7.7 | 143.4 | 160.1 | 2.84 | 86.0 |
| Ex 2 | $Na_{0.67}Mn_{0.7}Ni_{0.05}Ca_{0.25}O_2$ | 3.8510 | 7.2 | 143.0 | 160.0 | 2.84 | 80.9 |
| Ex 3 | $Na_{0.67}Mn_{0.7}Ni_{0.05}Ti_{0.25}O_2$ | 3.8672 | 8.2 | 143.6 | 160.3 | 2.84 | 87.3 |
| Ex 4 | $Na_{0.67}Mn_{0.7}Ni_{0.05}Ba_{0.25}O_2$ | 3.8702 | 8.4 | 143.2 | 160.1 | 2.84 | 89.1 |
| Ex 5 | $Na_{0.67}Mn_{0.7}Ni_{0.05}Zn_{0.25}O_2$ | 3.8663 | 8.8 | 143.5 | 160.2 | 2.84 | 86.5 |
| Ex 6 | $Na_{0.67}Mn_{0.7}Ni_{0.05}Cu_{0.25}O_2$ | 3.8663 | 7.7 | 143.3 | 160.1 | 2.84 | 86.5 |
| Ex 7 | $Na_{0.67}Mn_{0.7}Ni_{0.03}Mg_{0.27}O_2$ | 3.8690 | 7.8 | 141.3 | 157.7 | 2.80 | 88.5 |
| Ex 8 | $Na_{0.67}Mn_{0.7}Ni_{0.04}Mg_{0.26}O_2$ | 3.8676 | 7.7 | 142.4 | 159.0 | 2.83 | 87.8 |
| Ex 9 | $Na_{0.67}Mn_{0.7}Ni_{0.06}Mg_{0.24}O_2$ | 3.8648 | 7.6 | 142.2 | 158.8 | 2.87 | 87.1 |
| Ex 10 | $Na_{0.67}Mn_{0.7}Ni_{0.07}Mg_{0.23}O_2$ | 3.8632 | 7.5 | 140.6 | 156.9 | 2.91 | 86.4 |
| Ex 11 | $Na_{0.67}Mn_{0.7}Ni_{0.08}Mg_{0.22}O_2$ | 3.8619 | 7.5 | 138.4 | 154.5 | 2.94 | 85.6 |
| Ex 12 | $Na_{0.67}Mn_{0.7}Ni_{0.09}Mg_{0.21}O_2$ | 3.8602 | 7.5 | 136.7 | 152.6 | 2.97 | 85.1 |
| Ex 13 | $Na_{0.67}Mn_{0.7}Ni_{0.05}Mg_{0.25}O_2$ | 3.8661 | 3.0 | 123.6 | 143.2 | 2.84 | 78.9 |
| Ex 14 | $Na_{0.67}Mn_{0.7}Ni_{0.05}Mg_{0.25}O_2$ | 3.8661 | 5.0 | 141.2 | 158.1 | 2.84 | 81.7 |
| Ex 15 | $Na_{0.67}Mn_{0.7}Ni_{0.05}Mg_{0.25}O_2$ | 3.8661 | 12.0 | 141.6 | 159.3 | 2.84 | 83.2 |
| Ex 16 | $Na_{0.67}Mn_{0.7}Ni_{0.05}Mg_{0.25}O_2$ | 3.8661 | 20.0 | 121.4 | 136.5 | 2.84 | 80.6 |
| Ex 17 | $Na_{0.67}Mn_{0.62}Ni_{0.05}Mg_{0.33}O_2$ | 3.8774 | 7.3 | 134.6 | 150.2 | 2.71 | 89.7 |
| Ex 18 | $Na_{0.67}Mn_{0.65}Ni_{0.05}Mg_{0.3}O_2$ | 3.8732 | 7.6 | 135.9 | 151.7 | 2.74 | 89.2 |
| Ex 19 | $Na_{0.67}Mn_{0.67}Ni_{0.05}Mg_{0.28}O_2$ | 3.8704 | 8.2 | 136.8 | 152.7 | 2.76 | 88.7 |
| Ex 20 | $Na_{0.67}Mn_{0.73}Ni_{0.05}Mg_{0.22}O_2$ | 3.8608 | 8.9 | 137.2 | 153.2 | 3.02 | 82.3 |
| CEx 1 | $Na_{0.67}MnO_2$ | 3.8712 | 7.5 | 75 | 165 | 2.10 | 68.6 |
| CEx 2 | $Na_{0.67}Mn_{0.7}Mg_{0.3}O_2$ | 3.8703 | 7.7 | 70 | 150 | 2.30 | 100 |
| CEx 3 | $Na_{0.67}Ni_{0.3}Mn_{0.7}O_2$ | 3.8506 | 7.4 | 150 | 120 | 3.20 | 69.6 |

Comparative analysis of Examples 1-3 showed that the positive active material $Na_{0.67}MnO_2$ of Comparative 1 had lower charge specific capacity for the $1^{st}$ cycle and average voltage and poor Cycle capacity retention rate. For the positive active material $Na_{0.67}Mn_{0.7}Mg_{0.3}O_2$ of Comparative Example 2, through doping $Na_{0.67}MnO_2$ with Mg, a reversible phase transition (P2-OP4 phase transition) occurred during charge and discharge, which effectively improved the problem of poor cycle capacity retention rate caused by the irreversible phase transition (P2-O2 phase transition) of $Na_{0.67}MnO_2$. However the positive active material still had a decreased charge and/or discharge specific capacity. For the positive electrode active material $Na_{0.67}Ni_{0.3}Mn_{0.7}O_2$ of Comparative Example 3, doping $Na_{0.67}MnO_2$ with Ni reduced the capacity loss during the first charge and improved the average voltage of the material. However, due to the occurrence of irreversible phase transition (P2-O2 phase transition) during charge-discharge processes, the material had lower first Coulombic efficiency and poor cycle capacity retention rate.

For the positive active material $Na_{0.67}Mn_{0.7}Ni_{0.05}Mg_{0.25}O_2$ of Example 1 of the present application, by doping $Na_{0.67}MnO_2$ with an electrochemically active transition metal Ni and a non-electrochemically active metal Mg, the respective advantages and functions of transition metal Ni and metal Mg could be combined to enable the positive electrode active material to have an increased charge and/or discharge specific capacity, first Coulombic efficiency, average voltage and cycle capacity retention rate simultaneously, thereby making sure that the positive electrode active material could have a higher charge and/or discharge specific capacity, first Coulombic efficiency, average voltage and better cycle stability.

Comparative analysis of Examples 1 to 6 showed that the unit cell parameter c/a of the ternary metal oxide positive electrode active material doped with the same proportion but different non-electrochemically active metals B was affected by the ion radius of the metal B in which the larger the ionic radius, the larger the c/a value was, and the stronger the MO bond was. Thus the corresponding positive electrode active material had a more stable structure, and showed a better cycle performance.

Comparative analysis of Examples 1, 7 to 12 showed that the performance of the ternary metal oxide positive active materials with different ratios of transition metal Ni and metal Mg resulted from the synergistic effect of active metal Ni and inactive metal Mg, where along with the increase of the ratio of Mg content to Ni content in the material, the c/a value was larger and larger, the MO bond thus got stronger and stronger and the interlayer spacing of the material became greater and greater so that it was easier for sodium ions to deintercalate/intercalate between layers, thereby improving the charge and/or discharge specific capacity of the positive electrode active material. Also, the corresponding positive electrode active material had a more stable structure, and showed a higher cycle capacity retention rate. However, the ratio of the Mg content to the Ni content continued to increase and thus the content of the active metal Ni was relatively decreased, which was manifested in a relative decrease in the charge and/or discharge specific capacity of the positive electrode active material. Therefore, by optimizing the ratio of the active metal Ni and the inactive metal Mg in the material allowed the synergistic effect of the active metal Ni and the inactive metal Mg to function fully and improved the charge and/or discharge specific capacity and cycle capacity retention rate of the positive electrode active material.

Comparative analysis of Examples 13 to 16 showed that the ternary metal oxide positive electrode active materials with the same composition but different particle diameters, had a larger specific surface area when the positive electrode active material had a smaller particle size, and the side reactions would be more serious, which was manifested in a relatively reduced electrochemical performance of the positive electrode active material. When the particle size of the positive electrode active material was increased to a certain value, the active specific surface area of the positive electrode active material would be reduced, which was manifested in a relatively reduced electrochemical performance of the positive electrode active material. Therefore, the average particle size Dv50 of the positive electrode active material of the present application being from 3 μm to 20 μm, preferably from 5 μm to 12 μm allowed the positive electrode active material to have a higher charge and/or discharge specific capacity and cycle capacity retention rate.

In summary, the present application allows the positive electrode active material to have the specific chemical composition described above, so that the positive electrode active material has a high first-cycle charge and/or discharge specific capacity, average voltage, and cycle capacity retention rate and thus the sodium ion battery containing the same can have a high first-cycle charge and/or discharge specific capacity, average voltage and cycle capacity retention rate.

The above-mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A positive electrode active material satisfying the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and $$\frac{3.33+2(\delta-y-z)}{4} < x < \frac{3.33+2(\delta-y-z)}{3}.$$

2. The positive electrode active material according to claim 1, wherein the positive electrode active material satisfies $1\leq z/y \leq 12$.

3. The positive electrode active material according to claim 1, wherein the positive electrode active material has a unit cell parameter that satisfies $3.8510 \leq c/a \leq 4.9000$.

4. The positive active material according to claim 1, wherein the positive active material has an average particle diameter Dv50 of 3 μm-20 μm.

5. The positive active material according to claim 1, wherein the positive active material has a specific surface area of 0.01 m²/g-6 m²/g.

6. The positive active material according to claim 1, wherein the positive active material has a hexagonal phase crystal structure.

7. The positive active material according to claim 1, wherein the positive active material has a powder resistivity of 20 Ω·cm to 10000 Ω·cm under a pressure of 12 MPa.

8. The positive active material according to claim 1, wherein the positive active material has a tap density of ≥1.5 g/cm³; and/or,
the positive electrode active material has a compacted density of ≥3 g/cm³ under a pressure of 8 tons.

9. The positive electrode active material according to claim 1, wherein the positive electrode active material has a morphology in a polygonal sheet structure.

10. A process for preparing a positive electrode active material, comprising the following steps:
mixing a sodium precursor, manganese oxide, an oxide of A and an oxide of B to form a mixture, and then sintering the mixture to obtain the positive electrode active material;
wherein the positive electrode active material satisfies the chemical formula of $Na_{0.67}Mn_xA_yB_zO_{2\pm\delta}$, in which A is selected from one or more of Co, Ni and Cr, B is selected from one or more of Mg, Al, Ca, Ti, Cu, Zn and Ba, $0.6<x<1$, $0<y<0.1$, $0.6<x+y<0.8$, $z>0$, $x+y+z=1$, $0\leq\delta\leq0.1$, and $$\frac{3.33+2(\delta-y-z)}{4} < x < \frac{3.33+2(\delta-y-z)}{3}.$$

11. A sodium ion battery comprising a positive electrode plate, the positive electrode plate comprising the positive electrode active material according to claim 1.

12. An apparatus comprising the sodium ion battery according to claim 11.

13. The positive electrode active material according to claim 1, wherein the positive electrode active material satisfies $3 \leq z/y \leq 9$.

14. The positive electrode active material according to claim 1, wherein the positive electrode active material has a unit cell parameter that satisfies $3.8602 \leq c/a \leq 3.8800$.

15. The positive active material according to claim 1, wherein the positive active material has an average particle diameter Dv50 of 5 μm-12 μm.

16. The positive active material according to claim 1, wherein the positive active material has a specific surface area of 0.5 m²/g-4 m²/g.

17. The positive active material according to claim 1, wherein the positive active material has a powder resistivity of 20 Ω·cm to 1000 Ω·cm under a pressure of 12 MPa.

18. The positive active material according to claim 1, wherein the positive active material has a tap density of ≥1.5 g/cm³; and/or,
the positive electrode active material has a compacted density of from 3.5 g/cm³ to 5 g/cm³ under a pressure of 8 tons.

19. The positive active material according to claim 1, wherein the positive active material has a tap density of from 1.5 g/cm³ to 3.0 g/cm³; and/or,
the positive electrode active material has a compacted density of ≥3 g/cm³ under a pressure of 8 tons.

20. The positive active material according to claim 1, wherein the positive active material has a tap density of from 1.5 g/cm³ to 3.0 g/cm³; and/or,
the positive electrode active material has a compacted density of from 3.5 g/cm³ to 5 g/cm³ under a pressure of 8 tons.

21. The positive electrode active material according to claim 1, wherein the positive electrode active material has a morphology in a hexagonal sheet structure.

* * * * *